UNITED STATES PATENT OFFICE.

CHARLES KIRCHHOF, OF NEW YORK, N. Y.

IMPROVED METHOD OF INTEGRATING INCONSTANT ELECTRIC CURRENTS.

Specification forming part of Letters Patent No. 31,545, dated February 26, 1861.

*To all whom it may concern:*

Be it known that I, CHARLES KIRCHHOF, of the city and county and State of New York, have invented an entirely new method of gathering, encompassing, retaining, and regenerating electricity produced in any way whatsoever or by any source or generator, and also of transforming the short and inconstant electric impulses or currents to a complete whole, which is as constant and identical as that produced in any other way, and which may be used at pleasure for the same purposes as any other electric current would or might be used.

Every experiment heretofore made for the purpose of dispensing with the galvanic batteries on account of the inconvenience, trouble, and expense attending them has turned out to be a failure, and the rapidly-increasing application of the electric current for practical purposes induced me to search for something practical, which will be attended with less trouble and expense. I have now invented an entirely new way, as stated above, and I do hereby declare that the following is a full and exact description thereof, reference being had to the accompanying drawings, and to the letters of reference marked thereon, in which—

Figure 1 is a perspective view of the device called "regenerator," and Fig. 2 is a perspective view of the device called "translator," and Fig. 3 is a transverse section of a current-changer of a magneto-electric machine.

To enable others skilled in the art to make and use my invention, I will proceed to describe its arrangements, construction, operation, &c.

I first refer to the well-known scientific researches of Ritter's charging-pile, Grove's gas-battery, Poggendorf's polarization apparatus, (producing short interrupted currents,) Mueller's improvement on Poggendorf's balance, (German *wippe*,) the researches on polarization by Schoenbein, Farada, Davis, and others, Wheatstone's hyperoxidated electrodes, (afterward combined with zinc or amalgam of potassium,) the devices of Poggendorf, Mendler, and others for integrating secondary currents, &c. No practical use has yet been made of these inventions, and I will now proceed to show that mine differs entirely, because it operates on the following principles: First, electric currents possessing a certain amount of intensity, quantity, and resistance, or tensions of the two contrary electricities on re-establishing their equilibrium will never traverse an electrolytic liquid or similar compound without decomposing it partially, and the equivalents of the separated elements, being proportional to the activity of the current, will either surround the electrodes or escape in the form of gases or undergo any other chemical combination, and vice versa; second, two electrodes of different character or surrounded or covered by different electrolytes or substances excited by similar conducting liquids or solutions of similar character and possessing the property of dissolving at least one of them, or two electrodes of similar character, but immersed into different electrolytic liquids or different substances, which, in consequence of their affinity, have a tendency to produce, by entering into a combination, liquid chemical compounds, will produce an electric current proportional to the difference of their electro-chemical character; and therefore when a current has decomposed a certain amount of the electrolyte or electrolytes, and thereby disturbed the electro-chemical equilibrium and the separated elements (or their new combination) remaining in contact with the corresponding electrodes are disposed to restore the original equilibrium by a recombination, a reverse current will always be produced whenever the electrodes during the time of restoration are properly connected, unless chemical or physical local actions have taken place.

Any apparatus, arrangement, or device consisting of electrodes or conductors in combination or contact with or immersed into any electrolyte or electrolytes or chemical compound operating in the manner and on the principles as stated above may be called "regenerator," because if provided with the mechanical auxiliaries and arrangements which are indispensably necessary for the purpose of producing a favorable result it accepts, retains, collects, unites, and reserves or preserves the electricity generated or coming from any electric source whatsoever, and because it transforms any number of short impulses into a complete whole and reproduces a new and constant and continuous current corresponding to the charge and the arrange-